US012265870B2

(12) United States Patent
Liu et al.

(10) Patent No.: US 12,265,870 B2
(45) Date of Patent: *Apr. 1, 2025

(54) COMBINATION RFID/EAS TAGS AND METHODS OF MANUFACTURE

(71) Applicant: SML Intelligent Inventory Solutions LLC, Plano, TX (US)

(72) Inventors: Yichang Liu, Holly Springs, NC (US); Mohammed Ramzan, Halifax (GB); Mark Anton Abraham, Northamptonshire (GB)

(73) Assignee: SML Intelligent Inventory Solutions LLC, Plano, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/186,352

(22) Filed: Mar. 20, 2023

(65) Prior Publication Data

US 2023/0244898 A1 Aug. 3, 2023

Related U.S. Application Data

(63) Continuation-in-part of application No. 17/595,688, filed as application No. PCT/US2020/070032 on May 7, 2020, now Pat. No. 11,610,090.

(60) Provisional application No. 62/852,181, filed on May 23, 2019.

(51) Int. Cl.
*G06K 19/077* (2006.01)
(52) U.S. Cl.
CPC .............................. *G06K 19/07722* (2013.01)
(58) Field of Classification Search
None
See application file for complete search history.

(56) References Cited

U.S. PATENT DOCUMENTS

| 11,610,090 B2* | 3/2023 | Liu ...................... G08B 13/244 |
| 2007/0090955 A1 | 4/2007 | Cote et al. |
| 2008/0150719 A1 | 6/2008 | Cote et al. |
| 2009/0189768 A1 | 7/2009 | Copeland et al. |
| 2009/0231139 A1 | 9/2009 | Heurtier |
| 2010/0001079 A1 | 1/2010 | Martin et al. |
| 2010/0259392 A1 | 10/2010 | Chamandy et al. |
| 2012/0235870 A1 | 9/2012 | Forster |

(Continued)

FOREIGN PATENT DOCUMENTS

WO 2020237251 A1 11/2020

OTHER PUBLICATIONS

PCT/US2020/070032 International Preliminary Report on Patentability dated Feb. 26, 2021, 13 pages.

*Primary Examiner* — Thomas S McCormack
(74) *Attorney, Agent, or Firm* — Boisbrun Hofman, PLLC

(57) ABSTRACT

Disclosed are combination radio frequency identification (RFID) and electronic article surveillance (EAS) tags and methods of producing such tags. The claimed method is characterized by feeding a first plurality of first type inlays and a second plurality of second type inlays into a laminating machine, wherein each of the first and second type inlays are formed on first and second substrates, respectively; laminating the first type inlays to the second type inlays, thereby forming a plurality of pairs of the first and second type inlays, each of the pairs comprising an RFID inlay and an EAS inlay, wherein the RFID inlay and the EAS inlay of each pair are functionally independent.

17 Claims, 5 Drawing Sheets

(56) References Cited

U.S. PATENT DOCUMENTS

2012/0256732 A1* 10/2012 McAllister ............ B65C 11/006
340/10.2
2016/0086465 A1   3/2016 Li et al.
2017/0193776 A1   7/2017 West et al.
2018/0211499 A1   7/2018 Forster
2022/0222502 A1   7/2022 Liu et al.

* cited by examiner

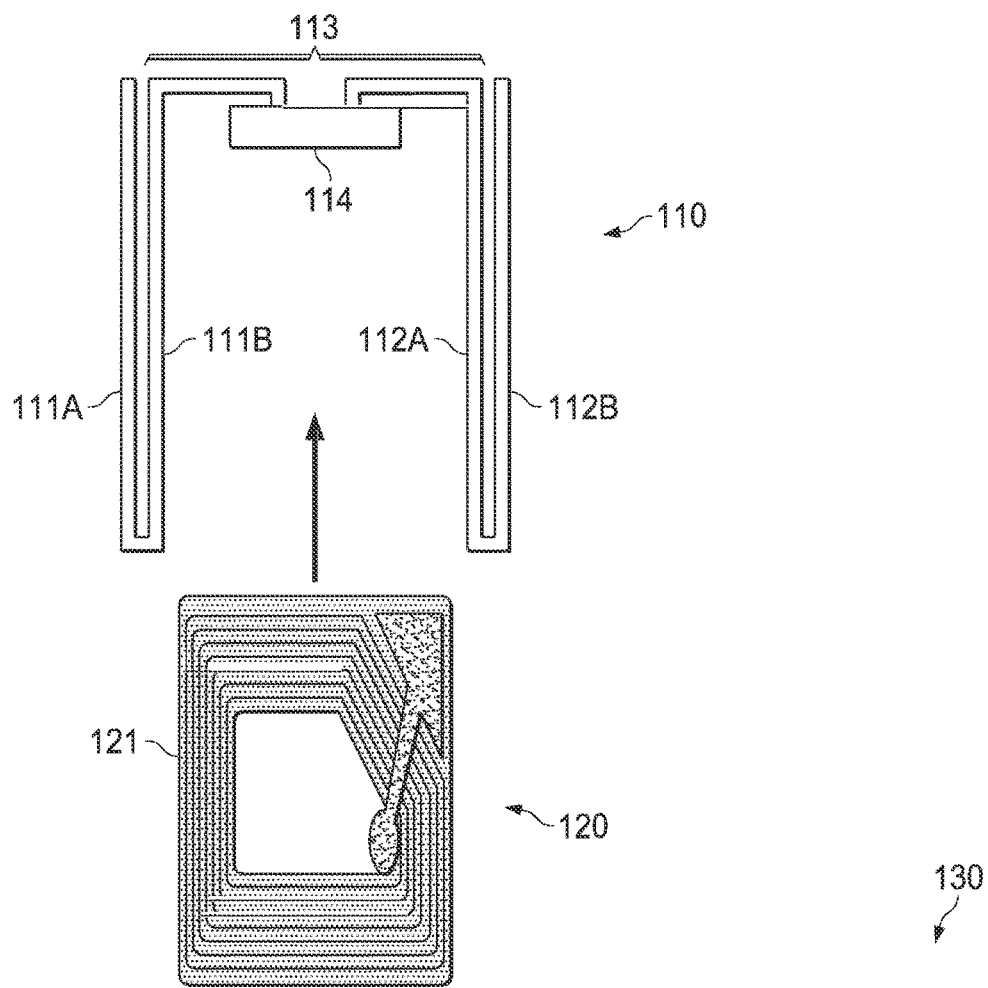
FIG. 1-A
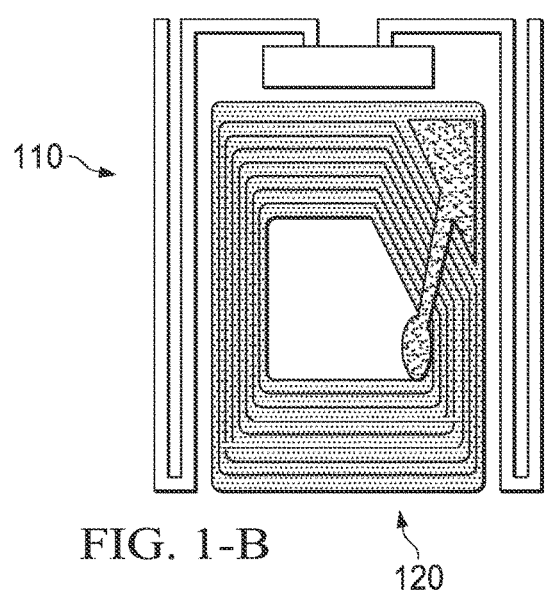
FIG. 1-B

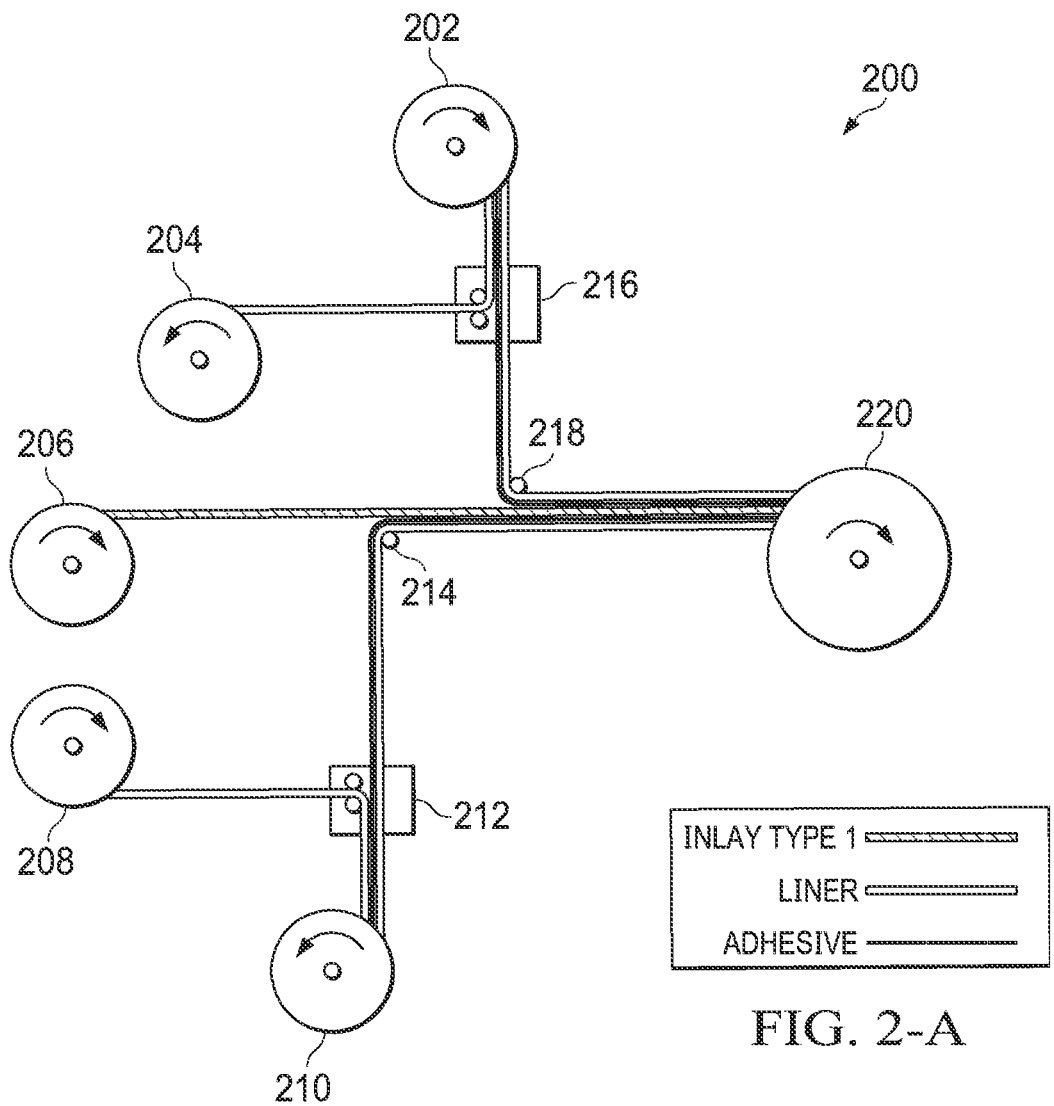
FIG. 2-A

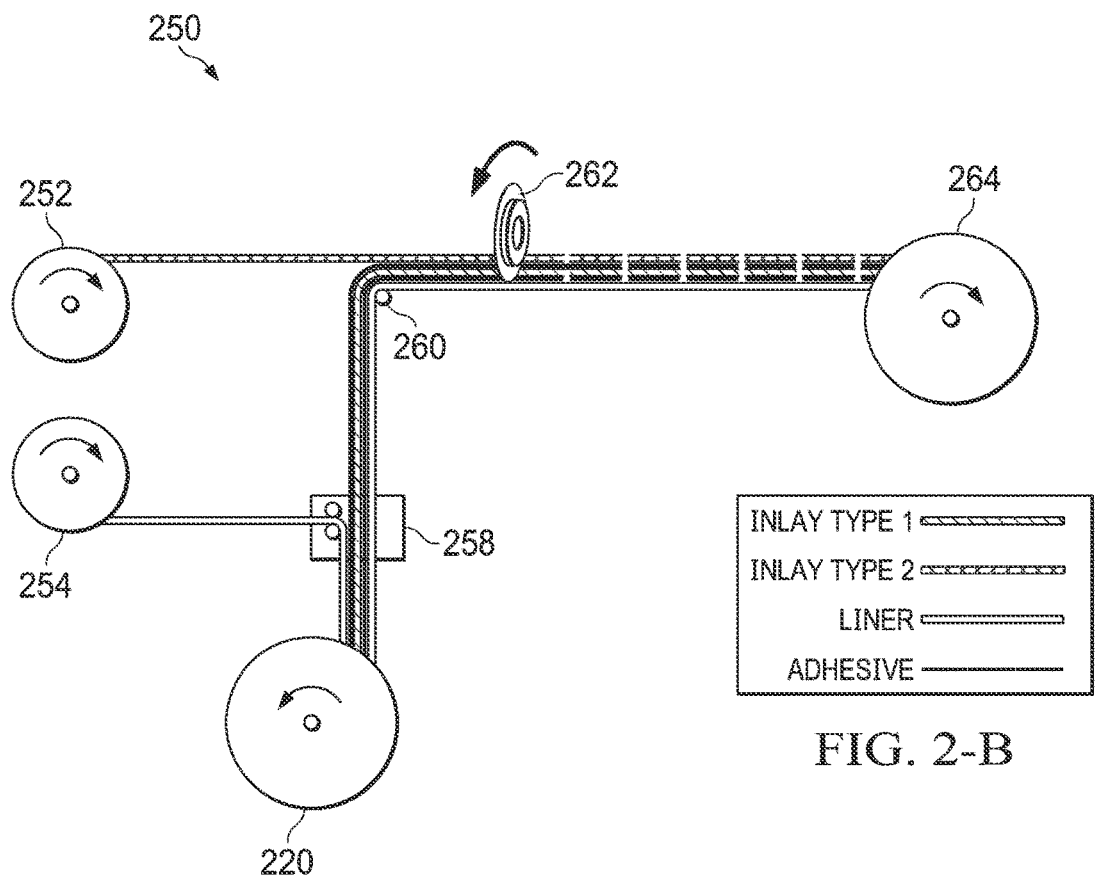
FIG. 2-B
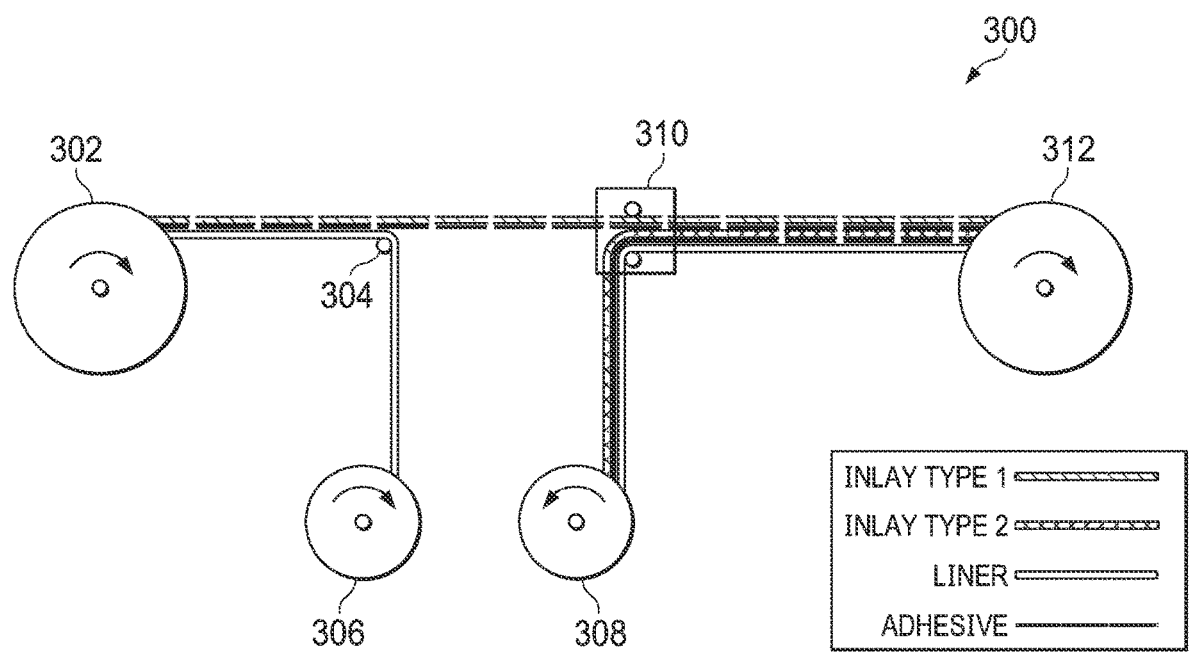
FIG. 3

COMBINATION RFID/EAS TAGS AND METHODS OF MANUFACTURE

This application claims the benefit of U.S. Provisional Application No. 62/852,181 entitled "DUAL PURPOSE MULTI-ANTENNA IDENTIFICATION TAG," filed May 23, 2019; PCT Application No. PCT/US2020/070032, entitled COMBINATION RFID/EAS TAGS AND METHODS OF MANUFACTURE, filed May 7, 2020; and U.S. patent application Ser. No. 17/595,688, entitled COMBINATION RFID/EAS TAGS AND METHODS OF MANUFACTURE, filed Nov. 22, 2021, which granted as U.S. Pat. No. 11,610,090 on Mar. 21, 2023, each of which is incorporated herein by reference.

TECHNICAL FIELD

The disclosure is directed, in general, to radio frequency identification (RFID) and electronic article surveillance (EAS) tags; and, in particular, to combination RFID/EAS tags and methods of manufacture thereof.

BACKGROUND

Radio frequency identification (RFID) uses electromagnetic fields to identify and track tags attached to objects. An RFID tag consists of three different components: an RFID "chip", which is an integrated circuit (IC), and an antenna, both affixed to a substrate. When triggered by an electromagnetic interrogation pulse from an RFID reader device, the tag transmits digital data, usually an identifying inventory number, back to the reader; the number can be used to inventory goods. There are two types of RFID tags; passive tags are powered by energy from an RFID reader's interrogating radio waves, and active tags are powered by a battery and can be read at a greater range from the RFID reader (up to hundreds of meters). Unlike a barcode, an RFID tag doesn't need to be within the line of sight of the reader, so it may be embedded in the tracked object.

An RFID tag IC has a logic unit that makes decisions and provides memory for stored data, such as a unique product ID. An RFID tag antenna, connected to the tag IC, is the largest part of the tag. The geometry of an antenna is determined by the frequency at which the tag operates; variations in antenna design allow tags to have different properties and behaviors. The antenna can be shaped, for example, as a spiral coil, a single dipole, dual dipoles (one perpendicular to other), or a folded dipole. The antenna is designed for a specific frequency of operation and the designated frequency determines an effective antenna length. A substrate holds the RFID IC and antenna together; an antenna can be deposited or printed on the substrate, and the IC is then attached to the antenna and the substrate. A substrate can be made from flexible material such as thin plastic, but it may also be made from rigid material. Most passive tags use substrates made from flexible material with a thickness of 38-50 microns. Suitable materials for a substrate include polymer, PVC, Polyethylenetherephtalate (PET), phenolics, polyesters, styrene, and even paper. The substrate material may affect the design frequency of the antenna; therefore, the effect of substrate material must be considered during proper tuning of the antenna.

Electronic article surveillance (EAS) is a technological method to prevent shoplifting from retail stores, pilferage of books from libraries or removal of properties from office buildings. Special tags are fixed to merchandise, books or other physical items; the tags are removed or deactivated when an item is properly purchased or authorized for removal from the premises. At the exits of a facility, a detection system sounds an alarm or otherwise alerts the staff when the system senses an active tag; some stores also have detection systems at the entrance to restrooms that sound an alarm if someone tries to take unpaid merchandise with them into the restroom. One common type of EAS tag utilizes radio frequencies; such RF EAS tags are essentially a resonant circuit comprising an inductor and capacitor. Sensing an RF EAS tag is achieved by sweeping around the resonant frequency and detecting a dip. Deactivation for EAS tags is typically achieved using a deactivation pad, which partially destroys the capacitor by applying a strong electromagnetic field at the resonant frequency, inducing a voltage that exceeds the capacitor's breakdown voltage. In the absence of such a device, labels can be rendered inactive by punching a hole, or by covering the circuit with a metallic label (i.e., a "detuner").

For retail applications, it is desirable for articles to have both RFID and EAS tags; an RFID tag for the purpose of inventory management and an EAS tag for security/theft prevention. Including both types of tags, particularly in combination, can present technical issues and additional costs. Accordingly, there is a need in the art for novel combination RFID/EAS tags that overcome the deficiencies of the prior art.

SUMMARY

To address the deficiencies of the prior art, disclosed herein are methods of producing combination radio frequency identification (RFID) and electronic article surveillance (EAS) tags using a converting or laminating machine. The method is characterized by feeding a first plurality of first type inlays and a second plurality of second type inlays into the converting or laminating machine, wherein each of the first and second type inlays are formed on first and second substrates, respectively; laminating the first type inlays to the second type inlays, thereby forming a plurality of pairs of the first and second type inlays, each of the pairs comprising an RFID inlay and an EAS inlay, wherein the RFID inlay and the EAS inlay of each pair are functionally independent.

In a first exemplary embodiment, the first plurality of first type inlays comprises a first common substrate and the second plurality of second type inlays comprises a second common substrate, the first and second type inlays distributed at common physical locations on the first and said second substates, respectively. In a related embodiment, the first or second common substrates comprises an adhesive layer and a removable waste liner, and the step of laminating the first substrate to the second substrate comprises removing the waste liner to expose the adhesive layer, the adhesive layer operative to bond the first common substrate and the second common substrate. In such embodiments, the method further comprises the step of cutting the laminated first and second common substrates carrying paired ones of the RFID and EAS inlays at locations between each pair, thereby forming individual combination RFID/EAS tags.

In a second exemplary embodiment, the first plurality of first type inlays are formed on a like plurality of individualized first substrates distributed on a first carrier sheet and the second plurality of second type inlays are formed on a like plurality of individualized second substrates distributed on a second carrier sheet. In a related embodiment, the step of laminating the first type inlays to the second type inlays comprises transferring individual ones of the first type inlays from the first carrier sheet to individual ones of the second type inlays on the second carrier sheet.

In the exemplary embodiment disclosed hereinafter, each of the first type inlays is an EAS inlay comprising a coil antenna and each of the second type inlays is an RFID inlay comprising a dipole antenna having first and second legs, wherein the coil antenna of an EAS inlay is substantially positioned between the first and second legs of the dipole antenna of an RFID inlay of each combination RFID/EAS tag.

The methods of producing combination RFID/EAS tags, as disclosed herein, have the advantage of independent quality-control testing of each RFID and EAS inlay prior to combining them; such testing prevents wastage associated with transferring a defective first type inlay to a functional second type inlay, and vice versa. In exemplary embodiments, the method further includes the step of testing each of the first and second type inlays prior to the step of laminating. Defective ones of the first and second type inlays can be indicated by, for example, applying a visible mark proximate to a defective inlay; the method can then further include the step of discarding ones of the combination RFID/EAS tags having the visible mark.

The first type inlay can be an EAS inlay and the second type inlay can be an RFID inlay, or vice versa. In the specifically disclosed embodiments, an EAS inlay comprises a coil antenna and an RFID inlay comprises a dipole antenna having first and second legs, wherein the coil antenna of an EAS inlay is substantially positioned between the first and second legs of the dipole antenna of an RFID inlay of each combination RFID/EAS tag. In a specific embodiment, the first and second legs of the dipole antenna comprise folded-back portions for tuning the dipole antenna to a desired operational frequency. The center portion of the dipole antenna and the first and second legs can form a "U" shape; in such embodiments, the coil antenna of the EAS inlay can be substantially positioned between the first and second legs of the dipole antenna of the RFID inlay, thereby minimizing the total surface area required for both inlays on a combination RFID/EAS tag.

The foregoing has broadly outlined the essential and optional features of the various embodiments that will be described in detail hereinafter; the essential and certain optional features form the subject matter of the appended claims. Those skilled in the art should recognize that the principles of the specifically-disclosed combination RFID/EAS tags, and methods of manufacture thereof, can be utilized as a basis for similar tags and methods of manufacture that are within the scope of the appended claims.

BRIEF DESCRIPTION OF THE DRAWINGS

For a complete understanding of the present disclosure, reference is now made to the following detailed description taken in conjunction with the accompanying drawings, in which:

FIGS. 1-A and 1-B illustrate an exemplary physical layout of a combination RFID/EAS tag according to the principles of the invention;

FIGS. 2-A and 2-B illustrate a first exemplary method of manufacturing combination RFID/EAS tags utilizing a converting machine according to the principles of the invention;

FIG. 3 illustrates a second exemplary method of manufacturing combination RFID/EAS tags utilizing a converting machine according to the principles of the invention;

Unless otherwise indicated, corresponding numerals and symbols in the different figures generally refer to corresponding parts or functions.

DETAILED DESCRIPTION

Figure 4:
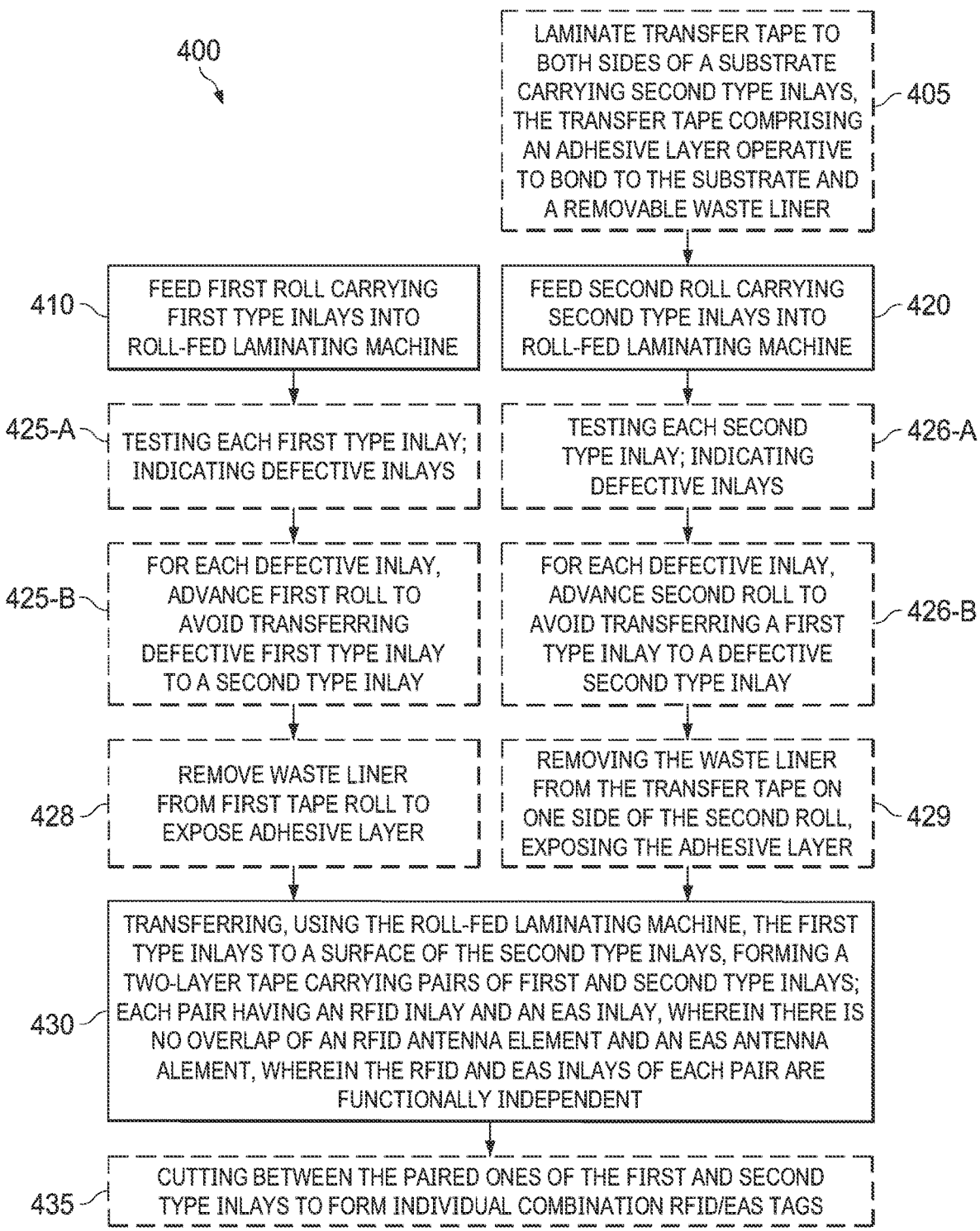
FIG. 4 illustrates a flowchart of the essential, and optional, steps of manufacturing combination RFID/EAS tags utilizing a converting machine according to the principles of the invention.

FIGS. 1-A and 1-B illustrate an exemplary physical layout of a combination RFID/EAS tag 130 according to the principles of the invention. The RFID/EAS tag 130 can be manufactured, according to the methods described hereinafter, from first and second rolls carrying RFID and EAS type inlays. For the exemplary RFID/EAS tag 130, as illustrated in FIG. 1-A, an RFID inlay 110 comprises a dipole antenna having first and second legs 111, 112, and the EAS inlay 120 comprises a coil antenna 121. In the embodiment illustrated in FIG. 1-A, the first leg 111 of the dipole antenna is folded back on itself, comprising portions 111A and 111B; similarly, the second leg 112 is folded back on itself, comprising portions 112A and 112B. The lengths of the legs can be selected to tune the dipole antenna to a desired operational frequency. The RFID inlay 110 further includes an integrated circuit (IC) 114 coupled to the dipole antenna. When an EAS inlay 120 is married to an RFID inlay 110, as described hereinafter, the coil antenna 121 of the EAS inlay 120 can be positioned between the first and second legs 111, 112 of the dipole antenna of RFID inlay 110, thereby minimizing the total area required for a combination RFID/EAS tag 130. For example, as illustrated in FIGS. 1-A and 1-B, the center portion 113 of the dipole antenna and the first and second legs 111, 112 form a "U" shape, and the coil antenna 121 of the EAS inlay 120 is positioned therein, thereby minimizing the total surface area required for both inlays on a combination RFID/EAS tag 130.

The first and second rolls, carrying the first and second type inlays, respectively, can be manufactured according to conventional methods known in the art. For example, a tape roll can include a substrate to hold the elements of an inlay. For a roll carrying RFID type inlays, the dipole antenna is deposited or printed on the substrate and the IC is then attached to the antenna. The substrate is usually made from flexible material; e.g., a polymer, polyvinyl chloride (PVC), polyethylene terephthalate (PET), polyesters, styrene and paper. The substrate material should have a smooth printing surface for antenna layout, durability and stability under various operating conditions, and adequate mechanical support for the antenna, chip, and their interconnections. The substrate material may affect the design frequency of the antenna; therefore, the effect of substrate material should be considered during proper tuning of the antenna.

Turning now to FIGS. 2-A and 2-B, illustrated is a first exemplary method of manufacturing combination RFID/EAS tags utilizing a converting machine; the method includes a first process illustrated in FIG. 2-A, the product of which is utilized in a second process illustrated in FIG. 2-B. An example of a converting machine which can be configured for performing the method is a Speedliner T-165 manufactured by BW Bielomatik; in general, such "converting" machines perform various operations on materials provided on rolls. In the first process, illustrated in FIG. 2-A, a first roll 206 is mounted in the laminating machine, together with first and second transfer tape rolls 202 and 210. The first roll 206 consists of a substrate carrying a first type inlay, either RFID or EAS; the transfer tape rolls 202 and 210 each consist of an adhesive layer between first and second liners. The product of the first process is collected on a roll 220. In operation, a first, or "waste", liner of transfer tape roll 210 is separated and collected by roll 208 and the remaining liner/adhesive is laminated 214 to a first side of roll 206. Similarly, a second "waste" liner of transfer tape roll 202 is separated and collected by roll 204 and the remaining liner/adhesive is laminated 216 to a second side of roll 206. The product of the first process, taken up by roll 220, consists of a substrate carrying first type inlays sandwiched between liner/adhesive layers.

In the second process, illustrated in FIG. 2-B, the product of the first process on roll 220 is laminated to second type inlays. Roll 220 is mounted in the converting machine, together with a second roll 252 carrying the second type inlays (opposite of the type carried by roll 220). In operation, a liner 254 is delaminated 258 to expose the adhesive layer on one side of the first type inlays from roll 220, and the second type inlays from roll 252 are laminated 260 thereto; the product of the second process is collected by roll 264. In certain embodiments, the second process can also include the step of cutting 262 between paired ones of the first and second type inlays at locations between each pair, thereby forming individual combination tags.

Turning now to FIG. 3, illustrated is a second exemplary method of manufacturing combination RFID/EAS tags utilizing a converting machine according to the principles of the invention. A first roll 302, carrying first type inlays, and a second roll 308, carrying second type inlays, are mounted in the converting machine. The first roll 302 consists of first type inlays carried by a transfer tape with a removable waste liner, which is taken up by roll 306, exposing an adhesive layer under at least each first type inlay. The first type inlays are transferred 310 to second type inlays carried by the first roll 308, and the product is collected by roll 312. In some embodiments, the first type inlays carried by first roll 302 are individually transferrable to the surface of the second type inlays carried by second roll 308; alternatively, the first type inlays may be carried by a continuous substrate that is laminated to the surface of the second roll 308.

The foregoing exemplary methods of manufacturing combination RFID/EAS tags utilizing a converting machine can be modified without departing from the principles of the invention. FIG. 4 illustrates a flow chart 400 of the essential, and optional, steps of manufacture. The essential steps comprise feeding a first roll carrying first type inlays 410 and a second roll carrying second type inlays 420 into a converting machine; and, transferring, using the converting machine, the first type inlays to a surface of the second type inlays 430, thereby forming a two-layer tape carrying pairs of first and second type inlays, each of the pairs comprising an RFID inlay and an EAS inlay, wherein there is no overlap of an RFID antenna element of each RFID inlay and an EAS antenna element of a paired EAS inlay, and wherein the RFID inlay and the EAS inlay of each pair are functionally independent. Various means of transferring the first type inlays to a surface of the second type inlays are possible, including the use of cold-roll or hot-roll laminators.

According to one exemplary embodiment, the method 400 further includes the step of removing a waste liner from the first roll to expose an adhesive layer operative to bond the first type inlays and the second type inlays 428. In a second exemplary embodiment, the second roll carrying the second type inlays is produced by laminating transfer tape to both sides of a substrate carrying the second type inlays 405, the transfer tape comprising an adhesive layer operative to bond to the substrate and a removable waste liner. Subsequently, the step of transferring the first type inlays to a surface of the second type inlays comprises removing the waste liner from the transfer tape on one side of the second roll 429, exposing the adhesive layer, and laminating the first type inlays carried by the first roll thereto.

The method of producing combination RFID/EAS tags using a converting machine, as disclosed herein, has the further advantage of independent quality-control testing of each first and second type inlay prior to combining them; such testing prevents wastage associated with transferring a defective first type inlay to a functional second type inlay, and vice versa. This is particularly of advantage for RFID inlays including an integrated circuit, which have a higher likelihood of being defective than an inlay only comprising passive circuitry. The point(s) of testing the inlays can be at any location within the machine prior to the point where the first and second type inlays are laminated. In a first such embodiment, the method of producing the combination tags includes testing each of the first type inlays, prior to the step of transferring to a surface of the second type inlays, and indicating defective ones thereof 425-A; and, for each defective first type inlay, advancing the roll carrying the first type inlays to avoid transferring a defective first type inlay to a second type inlay 425-A. Similarly, the method can include testing each of the second type inlays, prior to the step of transferring a first type inlay thereto, and indicating defective ones thereof 426-A; and, for each defective second type inlay, advancing the roll carrying the second type inlays to avoid laminating a first type inlay to a defective second type inlay 426-B. For both tests, indicating defective inlays can comprise applying a visible mark proximate to a defective inlay and the step of advancing the roll carrying the inlays is automatically performed in response to optically reading the visible mark just prior to the step of transferring. Alternatively, indicating defective inlays comprises storing a reference location associated with a defective inlay, the reference location indicative of the position of a defective inlay on the roll carrying it, and the step of advancing the roll carrying the inlays is automatically performed when the reference location reaches a location where the defective inlay would otherwise be laminated to the other type of inlay.

The method 400 can further include the step of cutting the tape between paired ones of the first and second type inlays, thereby forming individual combination RFID/EAS tags. The step of cutting may be complete or, alternatively, die cut only through the layers comprising the first and second type inlays, but not through a base substrate or liner such that the die-cut combination RFID/EAS tags can be maintained on a roll for subsequent transfer to separate physical tags (e.g., a paper tag for an article of clothing).

Figure 5:
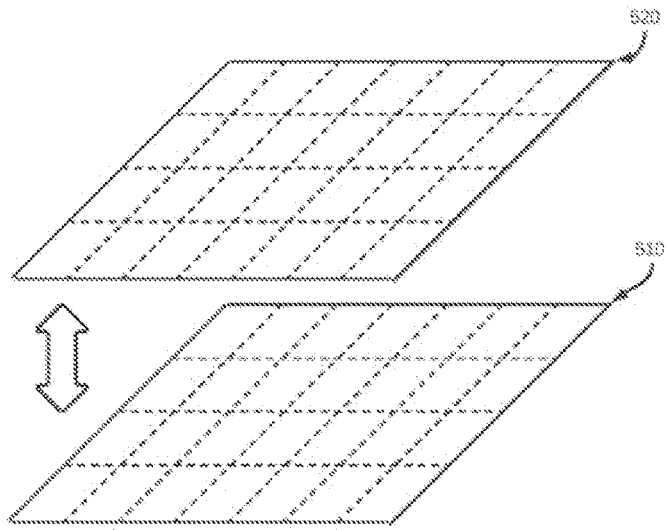
FIG. 5 illustrates exemplary inlay structures suitable for manufacturing combination RFID/EAS tags according to the principles of the invention; and, FIG. 6 illustrates a flowchart of a generalized method of manufacturing RFID/EAS tags utilizing converting or laminating machines according to the principles of the invention.

FIG. 5 illustrates exemplary inlay structures 510, 520 suitable for manufacturing combination RFID/EAS tags according to the principles of the invention; the structures are particularly suited to the manufacture of combination RFID/EAS tags utilizing a piece form or sheet form laminating machine, rather than a roll-to-roll process converting machine. Although either or both of the inlay structures 510, 520 can utilize flexible substrate materials, the nature of the structures are also suitable for rigid substrates.

In a first exemplary embodiment, inlay structures 510, 520 include first and second common substrates (such as described supra), respectively. First and second type inlays (not shown) are distributed at common physical locations on the first and second common substrates, respectively. The first and second type inlays can be, for example, RFID inlay 110 and EAS inlay 120 illustrated in FIG. 1.

In a second exemplary embodiment, the inlay structures 510, 520 can each comprise a plurality of individualized substrates distributed on a carrier sheet, similar to the structure of common printer labels (the dashed lines in FIG. 5 demarcate the boundaries of each individualized substrate).

Suitable laminating processes include, for example, piece form and sheet form processes. Piece form laminating is a manufacturing process in which two or more materials are bonded together to create a single, layered material. This process is often used in the production of composite materials, which are materials that are made up of multiple layers with different properties. In piece form laminating production, each layer of material is typically cut into a specific shape or size, known as a "piece." These pieces are then layered together in a specific order and bonded using a combination of heat, pressure, and adhesive materials. Sheet form laminating is a manufacturing process used to create composite materials by bonding two or more layers of material together. Unlike piece form laminating, in which each layer is cut into a specific shape or size, sheet form laminating involves bonding full sheets or rolls of material together. The process typically involves applying a layer of adhesive material to one or both sides of the materials to be bonded, then pressing the sheets together under high heat and pressure. This creates a strong, durable bond between the materials, creating a single, layered sheet.

Figure 6:
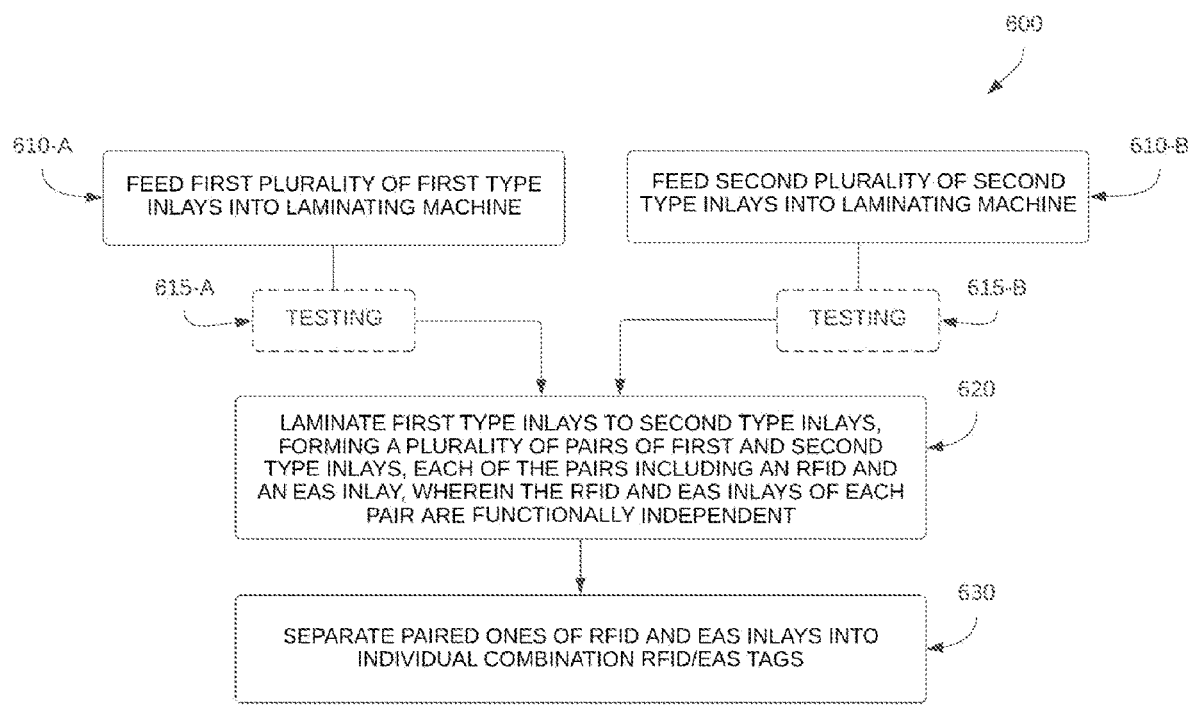

Finally, FIG. 6 illustrates a flowchart of a generalized method 600 of manufacturing combination RFID/EAS tags utilizing a laminating machine according to the principles of the invention. In general, a laminating machine is a machine used to manufacture a product in multiple layers. In one example, the laminating machine is a so-called converting machine, wherein input materials are provided on rolls, as described supra with respect to FIGS. 2-A, 2-B, 3 and 4; in a second example, the laminating machine can be a piece form or sheet form machine, wherein input materials are provided as flat sheets, as described with respect to FIG. 5. The generalized method is characterized by feeding, in a step 610-A a first plurality of first type inlays and, in a step 610-B, a second plurality of second type inlays into a laminating machine. The first and second type inlays are formed on first and second substrates, respectively (e.g., 206/252 302/308, 510/520). Optionally, in steps 615-A and 615-B, the first and second type inlays can be tested; if a defective inlay is identified, a mark can be applied proximate to the inlay to be used subsequently to identify and discard any combination RFID/EAS tags having either a defective first or second type inlay. In a second step 620, the first type inlays are laminated to the second type inlays, thereby forming a plurality of pairs of the first and second type inlays physically isolated by at least one of the first and second substrates, each of the pairs comprising an RFID inlay and an EAS inlay, wherein the RFID inlay and the EAS inlay of each pair are functionally independent. Finally, in a step 630, the paired RFID/EAS inlays are separated into individual combination RFID/EAS tags. If the inlay structures were formed on common substrates, such as previously described with reference to FIG. 2-B (262) and FIG. 5, this step can consist of cutting the laminated first and second common substrates carrying paired ones of the RFID and EAS inlays at locations between each pair, thereby forming individual combination RFID/EAS tags. If the inlay structures each comprise a plurality of individualized substrates distributed on a carrier sheet, (such as described with reference to FIG. 5), then this step can consist of separating paired ones of the combination RFID/EAS tags from the carrier sheets.

In a first exemplary embodiment, the laminating machine is a converting-type machine, wherein the first and second type inlay substrates can be, for example, a first roll 206 and a second roll 252 carrying first and second type inlays 110, 120, respectively, as described with reference to FIGS. 2-A and 2-B, or first roll 302 and second roll 308 as described with reference to FIG. 3. Alternatively, in a second exemplary embodiment, the laminating machine can be a machine suitable for piece form or sheet form manufacturing processes, as described supra, wherein inlay structures such as 510, 520, as illustrated and described with reference to FIG. 5, are utilized to carry the first and second type inlays. In both exemplary embodiments, the first and second type inlays are fed into, and laminated by, the laminating/converting machine to form a plurality of pairs of first and second type inlays physically isolated by at least one of first and second substrates, each of the pairs comprising an RFID inlay and an EAS inlay, wherein the RFID inlay and the EAS inlay of each pair are functionally independent.

With reference to both FIGS. 5 and 6, for each embodiment of the inlay structures 510, 520, an adhesive layer (not shown) can be applied to either of the first or second common substrates to facilitate laminating the first and second common substrates. In a first exemplary embodiment, wherein inlay structures 510, 520 include first and second common substrates (such as described supra), respectively, the step of laminating 630 includes the step of removing a waste liner from the adhesive layer prior to the step of laminating the first common substrate to the second substrate. In this exemplary embodiment, the method further comprises the step of cutting the laminated first and second common substrates carrying paired ones of the RFID and EAS inlays at locations (dashed lines in FIG. 5) between each pair, thereby forming individual combination RFID/EAS tags. In a second exemplary embodiment, wherein the inlay structures 510, 520 each comprise a plurality of individualized substrates distributed on a carrier sheet, the step of laminating 630 the first type inlays on inlay structure 510 to the second type inlays on inlay structure 520 is characterized by transferring individual ones of the first type inlays from the first carrier sheet to individual ones of the second type inlays on the second carrier sheet, or vice versa. This can be accomplished through various means, including the use of an adhesive layer as described with respect to the prior embodiment.

The foregoing has described various embodiments of combination RFID/EAS tags and methods of manufacture thereof; and, in particular, to combination RFID/EAS tags and methods of manufacture using a converting or laminating machine. The disclosed apparatus and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

The invention claimed is:

1. A method of producing combination radio frequency identification (RFID) and electronic article surveillance (EAS) tags, comprising the steps of:

feeding a first plurality of first type inlays and a second plurality of second type inlays into a laminating machine, wherein each of said first and second type inlays are formed on first and second substrates, respectively;

laminating said first type inlays to said second type inlays, thereby forming a plurality of pairs of said first and second type inlays physically isolated by at least one of said first and second substrates, each of said pairs comprising an RFID inlay and an EAS inlay, wherein said RFID inlay and said EAS inlay of each of said pairs are functionally independent.

2. The method recited in claim 1, wherein said first plurality of first type inlays comprise a first common substrate and said second plurality of second type inlays comprise a second common substrate, said first and second type inlays distributed at common physical locations on said first and said second substates, respectively.

3. The method recited in claim 2, wherein one of said first and second common substrates comprises an adhesive layer and a removable waste liner, and wherein the step of laminating said first type inlays to said second type inlays comprises removing said waste liner to expose said adhesive layer, said adhesive layer operative to bond said first common substrate and said second common substrate.

4. The method recited in claim 2, further comprising the step of cutting said laminated first and second common substrates carrying paired ones of said RFID and EAS inlays at locations between each of said pairs, thereby forming individual combination RFID/EAS tags.

5. The method recited in claim 1, wherein said first plurality of first type inlays is formed on a like plurality of individualized first substrates distributed on a first carrier sheet and said second plurality of second type inlays are formed on a like plurality of individualized second substrates distributed on a second carrier sheet.

6. The method recited in claim 5, wherein the step of laminating said first type inlays to said second type inlays comprises transferring individual ones of said first type inlays from said first carrier sheet to individual ones of said second type inlays on said second carrier sheet.

7. The method recited in claim 1, wherein each of said first type inlays is said EAS inlay comprising a coil antenna and each of said second type inlays is said RFID inlay comprising a dipole antenna having first and second legs, wherein said coil antenna of said EAS inlay is substantially positioned between said first and second legs of said dipole antenna of said RFID inlay of each of said combination RFID/EAS tags.

8. The method recited in claim 1, further comprising the step of:
testing each of said first and second type inlays prior to the step of laminating said first type inlays to said second type inlays.

9. The method recited in claim 8, further comprising the step of indicating defective ones of said first and second type inlays by applying a visible mark proximate to a defective inlay.

10. The method recited in claim 9, further comprising the step of discarding ones of said combination RFID/EAS tags having said visible mark.

11. A combination radio frequency identification (RFID) and electronic article surveillance (EAS) tag, comprising:
a first substrate carrying an RFID inlay, said RFID inlay comprising an RFID antenna element and an integrated circuit coupled thereto; and,
a second substrate carrying an EAS inlay, said EAS inlay comprising an EAS antenna element;
wherein said first and second substrates are laminated together such that at least one of said first and second substrates physically isolates said RFID inlay from said EAS inlay, and wherein said RFID inlay is functionally independent from said EAS inlay.

12. The combination RFID and EAS tag recited in claim 11, wherein said RFID antenna element comprises a dipole antenna having first and second legs and said EAS inlay comprises a coil antenna, wherein the coil antenna of said EAS inlay is substantially positioned between said first and second legs of the dipole antenna of said RFID inlay from a perspective perpendicular to said first and second substrates.

13. The combination RFID and EAS tag recited in claim 11, wherein each of said first and second legs of said dipole antenna comprise folded-back portions for tuning said dipole antenna to a desired operational frequency.

14. The combination RFID and EAS tag recited in claim 11, wherein a center portion of said dipole antenna and said first and second legs form a "U" shape.

15. The combination RFID and EAS tag recited in claim 11, wherein said RFID antenna element is operational at ultra-high frequencies (UHF).

16. The combination RFID and EAS tag recited in claim 11, wherein said first and second substrates have identical lengths and widths.

17. The combination RFID and EAS tag recited in claim 11, wherein there is no overlap of said RFID antenna element of said RFID inlay and said EAS antenna element of said EAS inlay.

* * * * *